Aug. 19, 1969  W. L. GRUBE  3,462,137
AUTOMATIC LOAD BINDER
Filed Sept. 15, 1967  2 Sheets-Sheet 1
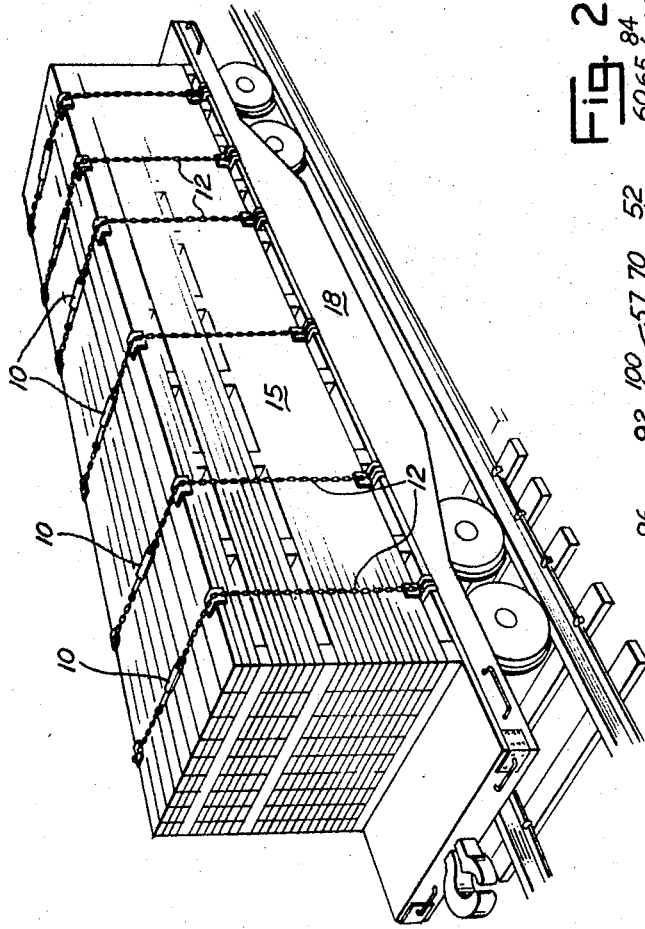
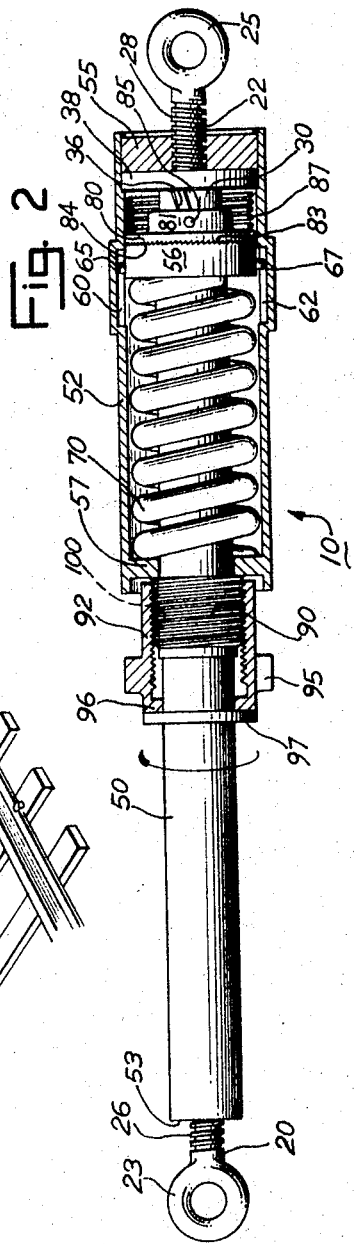
INVENTOR.
WILLIAM L. GRUBE
BY
Horton, Davis, Brewer & Brugman
ATTORNEYS Aug. 19, 1969
W. L. GRUBE
3,462,137
AUTOMATIC LOAD BINDER
Filed Sept. 15, 1967
2 Sheets-Sheet 2
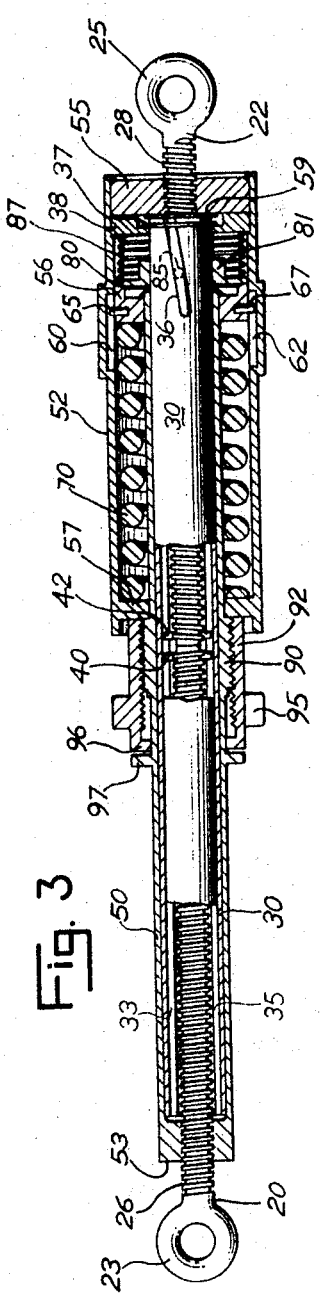
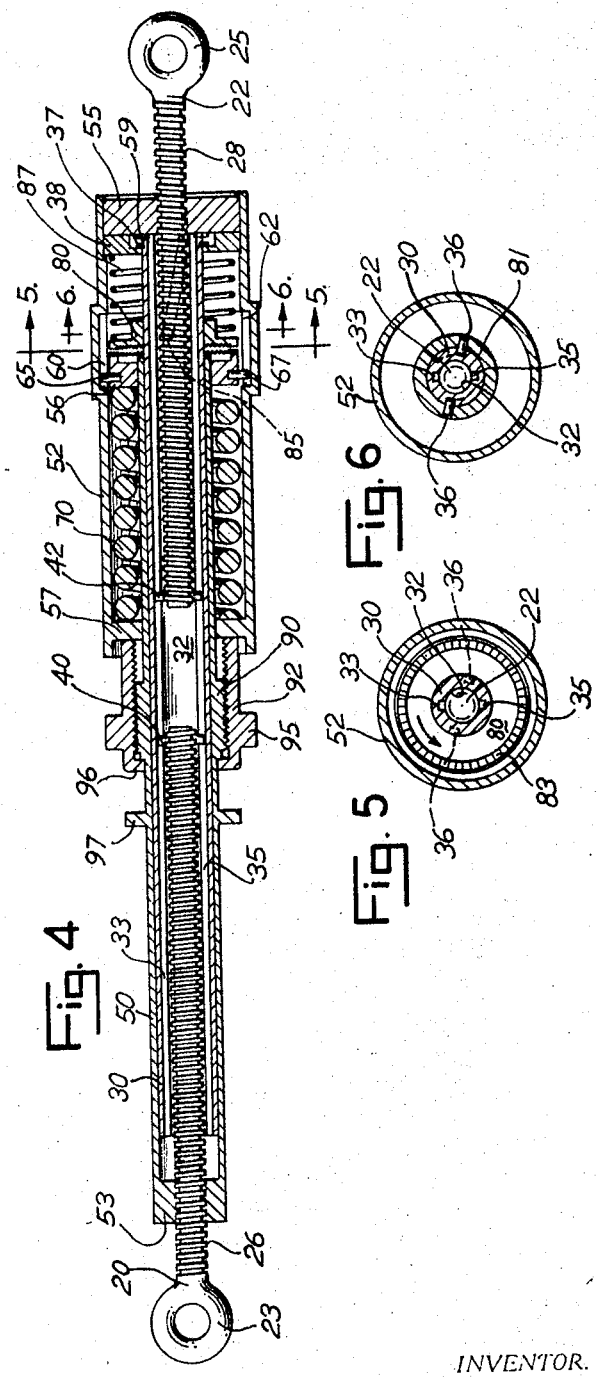
INVENTOR.
WILLIAM L. GRUBE
BY
Horton, Davis, Brewer & Brugman
ATTORNEYS

United States Patent Office 3,462,137
Patented Aug. 19, 1969

3,462,137
AUTOMATIC LOAD BINDER
William L. Grube, Northbrook, Ill., assignor to Mac-
Lean-Fogg Lock Nut Co., Mundelein, Ill., a corpora-
tion of Delaware
Filed Sept. 15, 1967, Ser. No. 667,994
Int. Cl. B60p 7/08; B61d 43/00; B65j 1/22
U.S. Cl. 267—74                                                15 Claims

ABSTRACT OF THE DISCLOSURE

A load binder having a pair of tightening screws keyed together in a sleeve and extending through the threaded ends of telescoping tubes which are connected to rotate together for axial relative screw movement. A main compression spring urges telescoping of the tubes in opposition to a tension load. A one-way clutch rides on the sleeve along a helical guideway in response to axial movements caused by load variations and is biased to engage and rotate the tubes only in a tightening direction for automatic maintenance of tension. A jackscrew release telescopes the tubes beyond the clutch travel limits for separation therefrom, allowing tube rotation in a loosening direction.

BACKGROUND OF THE INVENTION

This invention relates generally to load binders, and in particular, to an automatic load binder for maintenance of tension at a minimum value.

Normally, lading of a compressible but inelastic nature, such as stacked lumber, wall board, packaged or crated commodities, etc., is secured on a carrier by the tie-downs such as chains, strappings, cable, etc. Random varied motions during transport (rolling, swinging, bouncing, vibrating, jerking, etc.), often cause a loosening of the tie-downs allowing the load to shift. Applying additional tension to the tie-downs was found to be ineffectual, since motion of the carrier causes the load to gradually but incessantly settle. This, consequently, reduces the tension and sometimes even allows the development of slack in the tie-downs. The risk of loss or damage to the commodities, and more seriously, a hazard to public safety, is clear.

In the past, the inclusion of an elastic element in the tie-downs has been of some aid in maintaining tension. However, the amount of travel or "give" of the elastic elements is of course, limited and the amount of settling or gradual compressing of the load is often beyond the capability of the elastic elements. Thus, it has been found that though elastic elements may prolong loosening, they cannot entirely eliminate it.

Furthermore, on a moving carrier, tie-down tension is dynamic, varying between maximum and minimum values, dependent on such factors as physical characteristics of a load, period and amplitude of the carrier, magnitude of the mean tension, elasticity of the tie-down, etc. This means that if the mean tension on the tie-down at any given instant is not great enough, a transient slack may develop, which also could allow shifting, damage and hazard. Thus, it has been the practice to apply initial static tension of a sufficient value determined by trial and error for the more commonly shipped commodities. Naturally, such values are no more than a rough guide and are not suitable for uncommon commodities and unexpected conditions, such as rough road beds or heavy seas. Clearly, something better is needed to maintain sufficient tension on lading tie-downs.

SUMMARY OF THE INVENTION

Therefore, to overcome the foregoing and other difficulties of the prior art, the general object of this invention is to provide a new and improved automatic load binder. To this end, the present invention teaches a device in the nature of a spring loaded turnbuckle which axially expands and contracts as the tension load varies. A one-way clutch is activated by the axial expansion and compression to turn the device only in a tightening direction and thereby instantaneously automatically maintain a minimum tension.

The load binder device has a pair of tightening screws adapted for connection in a tension load and keyed together in a sleeve, to prevent relative rotation, yet allowing axial movement therebetween. The screws extend through the threaded ends of two telescoping tubes which are connected for rotation together to axially move the screws relative thereto. A main compression spring urges telescoping of the tubes in opposition to the tension load. A one-way clutch rides on the sleeve along the helical guideway in response to axial movements caused by load variations. A clutch spring biases the clutch in opposition to the urging of the main spring for engagement of ratchet teeth to rotate the tubes only in a tightening direction. Upon the return direction, the clutch ratchets by the tubes and in this manner automatically maintains a minimum tension.

A lugged jackscrew release may be engaged by a hand tool, such as a ratchet wrench, to telescope the tubes beyond the clutch travel limits for separation therefrom. The jackscrew release direction and the loosening direction are the same, so a continued turning in the same direction after separation loosens the device. Rotation in a reverse tightening direction, of course, will re-engage the clutch, which then ratchets by the tubes. The hand tightening may be continued to a desired initial value. The jackscrew threads have an axial groove thereacross for reception of a nylon insert member that provides a constant pressure between mating threads. In this manner, resistance is provided in the jackscrew to prevent vibratory loosening and to provide a minimum torsion resistance for operation of a ratchet hand tool.

Thus, one of the objects of this invention is to automatically maintain tension at a minimum value in a lading tie-down.

It is an object of this invention to provide an automatic load binder having a one-way clutch activated by variations in load tension to maintain a minimum tension value.

Another object of this invention is to provide an automatic load binder having a release mechanism enabling a loosening thereof.

It is still another object to provide an automatic load binder with release mechanism which may be either tightened or loosened by use of ordinary hand tools such as a ratchet wrench.

Yet another object is to provide an automatic load binder with a jackscrew release which has sufficient torsion resistance to prevent vibratory loosening and to provide resistance for operation of a ratchet wrench.

It is also an object to provide a durable, automatic load binder of simple construction and operation which is economical to produce by utilizing a minimum of conventional, currently available materials that lend themselves to standard mass-production manufacturing techniques.

Further and other objects, and a more complete understanding of the invention may be had by referring to the following description and claims, taken in conjunction with the accompanying drawings.

DESCRIPTION OF THE DRAWINGS

For the purpose of illustrating the invention, there is shown in the drawings in the form which is presently preferred, it being understood, however, that this invention is not necessarily limited to the precise arrangements and instrumentalities there shown.

FIG. 1 is a perspective view illustrating the invention in use in a tie-down on a railway flat car.

FIG. 2 is a plan view, partially in section, of the invented device, showing the winding lugs positioned for tightening.

FIG. 3 is a view of the automatic load binder shown in FIG. 2, somewhat more in cross-section, showing the winding lugs positioned for loosening.

FIG. 4 is a complete cross-section of the invented device, loosened as compared to FIGS. 2 and 3, showing disengagement of the one-way clutch.

FIGS. 5 and 6 are cross-sections of FIG. 4 taken along lines 5 and 6, respectively, in the direction indicated by the arrows.

DESCRIPTION OF THE PREFERRED EMBODIMENT

Referring now to the drawings in detail, wherein like numerals indicate like elements, there is shown in FIG. 1, an illustration of the automatic load binder of the present invention, designated generally at 10. As illustrated, the load binders 10 are connected in lading tie-down, shown in the illustration as chains 12 securing the lading 15 upon the railroad car 18. Details of the invented device are shown with reference to the remaining figures.

A pair of screws 20, 22 are in axial alignment and have outer ends adapted for connection in a tension load, for example, a lading tie-down at the screw eyes 23, 25. It is to be noted that the screws 20, 22 are of opposite thread, that is, screw 20 has a right hand thread 26, and screw 22 has a left hand thread 28.

A sleeve 30 (partially visible in FIG. 2), best seen with reference to FIGS. 3 through 6, slidably receives screws 20, 22 within an interior bore 32. Diametrically opposed longitudinal keyways 33, 35 extend axially the entire length of interior bore 32, as shown. A helical guideway 36 cut in the exterior sleeve surface has a limited travel from one end of sleeve 30. As shown in the cross-sections of FIGS. 5 and 6, a helical guideway 36 may be provided on each side of sleeve 30 at diametrically opposed positions. A retaining washer 38 is retained at the same end by a snap ring 37 in a groove provided in sleeve 30, as indicated.

Key means preventing relative rotation between screws 20, 22 and sleeve 30, yet allowing axial movements therebetween, are provided by the radial pins 40, 42 extending as shown in FIGS. 3 and 4, across a diameter at the innermost ends of the screws 20, 22 to extend into the keyways 33, 35. Thus, it is clear that while the screws 20, 22 are free to move axially within the sleeve 30, relative rotation therebetween is prevented by the pins 40, 42 within the keyways 33, 35.

A pair of telescoping tubes 50, 52 in turn, receive the sleeve 30. The closed tube ends 53, 55, respectively, are threaded, as shown, for engagement with respective of the screws 20, 22. As visualized best with reference to FIGS. 3 and 4, the sleeve 30 slidably fits within the innermost tube 50, which telescopes within outer most tube 52. Innermost tube 50 has an open end at which is affixed a large, circular flange 56 of approximating the interior diameter of outermost tube 52. Circular flange 56 and tube 50 are affixed together by welding or the like. A somewhat restricted opening approximating the outer diameter of tube 50, is provided by a radially inward directed flange 57 at the open end of outer tube 52. A bearing bushing 59, provides smooth low friction surfaces between sleeve 30 and end 55, allowing rotation of the tube 52 while bearing against the end of sleeve 30.

Radial means connecting the telescoping tubes 50, 52 for rotation together are provided by diametrically opposed axial slots 60, 62 in tube 53, together with the radial pins 65, 67 extending outward from the flange 56 of tube 50. A cover plate 68 may be provided, integrally formed or welded on, to close slots 60, 62 and prevent entry of foreign material therein. Thus it is, of course, understood that while the tubes 50, 52 may telescope to the extent of travel of radial pins 65, 67 within the axial slots 60, 62, that both tubes must rotate together, by virtue of the pins' presence in the axial slots.

Resilient means urging the telescoping of the tubes are provided by a main coil spring 70 between the flanges 56 and 57 of the tubes 50, 52, respectively. The main spring 70 bears against the radial flanges 56, 57, urging them apart. It is easily visualized that expansion of the main spring 70 urges telescoping of innermost tube 50 into the outermost tube 52 in opposition to any tension load connected across the screws 20, 22. Naturally, variation in load tension will cause a corresponding compression or expansion of the main spring.

A clutch means is provided for one-way rotation of the tubes 50, 52 in response to any axial movement caused by variations in load tension. A circular clutch plate 80, including an integral collar 81, is mounted for travel on the sleeve 30. The clutch face of clutch plate 80 has one-way ratchet teeth 83 for engagement with corresponding ratchet teeth 84 on the outward face of the radial flange 56. A follower rod 85 extends from collar 81 into each helical guideway 36 at the exterior of sleeve 30. It is clear that axial movement of clutch plate 80 must be helical in direction by virtue of movement of follower rods 85 within guideways 36. A clutch spring 87 between the clutch plate 80 and the end plate 38 of sleeve 30 biases engagement of the ratchet teeth 83, 84.

Release means are provided to disengage the clutch for rotation in a loosening direction. In the embodiment shown, release means are provided by a jackscrew 90 and jack nut 92. Exterior lugs 95 allow engagement for rotation by a hand tool, such as a ratchet wrench (not shown). Jackscrew 90 is integral with the innermost tube 50 at an exterior position outside of tube 52. The jack nut 92 may be turned by lugs 95 to compress main spring 70. That is, upon turning, one side of jack nut 92 bears against the radial flange 57 of the outermost tube 52 to move it outward. The opposite side of jack nut 92 has an inwardly directed flange 96 which closely receives the innermost tube 50 as shown. A stop means is provided by an integral collar member 97 extending radially from innermost tube 50. As demonstrated at FIG. 2, outward travel of the jack nut 92 is limited by collar 97.

With reference to FIG. 2, an elastic means maintaining constant engagement between mating threads of the jackscrew and nut 90, 92, is provided by one or more elongated nylon inserts 100 received within axial grooves provided therein. It is understood that the grooves may be provided in either one or the other of the matching threads, as desired.

The invented load binders 10 may be applied in several lading tie-downs to secure a load, as illustrated in FIG. 1. Since screws 20, 22 are connected at eyes 23, 25 to tie-down chains 12, they may be considered along with sleeve 30, as being rotationally stationary. Initial tension will be applied by application of a hand tool (not shown), such as a ratchet wrench, to the lugs 95 for turning in the direction indicated by the arrow on FIG. 2. The jack nut 92 moves axially along jackscrew 90 toward the left in FIGS. 2–4, to bear against collar 97 and transmit torsion to the innermost tube 50. Torsion of tube 52 in turn is transmitted through the pins 65, 67 and axial slots 60, 62 to the outermost tube 52. In this manner telescoping tubes 50, 52 are rotated together, causing the screws 20, 22 to move axially inward. In this manner the desired amount of tension may be achieved by hand. During the transit of the load 15, main spring 70 will react to variations in the tension load caused by jolts, vibrations, etc. Compression or expansion of the spring 70 will cause an axial movement of the clutch plate 80 along the helical guideways 36. Main spring 70 will expand whenever tension in the tie-down chains 12 becomes less than its strength, causing a further telescoping of the tubes 50, 52. At the same time, clutch plate 80 will move axially outward following a helical course. As viewed in the cross-section of FIG. 5, the clutch plate 80 will turn as indicated by the arrow in a counterclockwise direction. Ratchet teeth 83, 84 engage together, as illustrated in FIG. 2, upon any such counterclockwise rotation of clutch plate 80 relative to flange 56. Thus tubes 50, 52 must rotate with clutch plate 80 in a winding direction. Screws 20, 22 move axially inward within sleeve 30, to tighten and maintain a minimum tension proportionate to the strength chosen for main spring 70. The minimum tension maintained will be a value somewhat less than the strength of the main spring 70, since some energy of spring 70 is expended in rotation of the tubes 50, 52. Upon a reverse rotation caused by compression of the main spring 70, that is, an increase in tension in the tie-down chains 12, the tubes 50, 52 will telescope outwardly. Coil spring 87 will bias the clutch plate 80 to follow flange 56, this time in a helical clockwise direction, opposite the arrow direction, as viewed in FIG. 5. In this case the engaging teeth will ratchet by one another allowing the clutch plate 80 to turn without any rotation of the tubes 50, 52. Therefore, the load binder 10 is not loosened by the return axial movement.

It is to be noted that the tubes 50, 52 cannot turn in a loosening direction, as this is prevented by the engagement of the ratchet teeth 83, 84, requiring axial movement together of clutch 80 and flange 36 against the bias of spring 70 (the screws 20, 22 and sleeve 30 being held stationary by the lading tie). On the other hand, the load binder 10 can continue to turn in a tightening direction until the spring 70 is completely compressed. However, vibrations during transit do cause a continual unloosening of the tubes 50, 52 about the screws 20, 22. This may be accounted for by slight play in the fit tolerances and transitory compression of spring 70 allowing flange 56 and clutch 80 to be turned together in a loosening direction. Then upon reaching a minimum tension the aforedescribed action by expansion of spring 70 will again serve to tighten load binder 10. This cycle will be repeated again and again to maintain a minimum tension in the load binder.

It is, of course, desirable to be able to manually release the load binder and this is provided by the separation of the clutch plate 80 from the radial flange 56. By turning the jack nut 90 in an opposite loosening direction it will begin to move toward the outermost tube 52 and against flange 57, as indicated by the change from FIG. 2 to FIG. 3. Continued turning of the jack nut in the same direction will cause a compression of the main spring 70, as shown in FIG. 4. The compression of main spring 70 will allow the radial flange 56 to move past the limit of the helical guideway 36, as shown. When the clutch plate 80 reaches the travel limits of the guideway 36, it will stop, as shown in FIG. 4. However, the continued compression of main spring 70 will continue to move the flange 56 for separation from the clutch plate 80, whereupon it will be possible to turn the tubes 50, 52 in a loosening direction with respect to the screws 20, 22, causing them to move axially apart to loosen the lading tie-down.

The nylon insert 100 in the axial groove of jackscrew 90 provides a continued pressure between the mating threads. This prevents an accidental loosening of the jack nut 95 by vibration. Furthermore, this provides resistance for the operation of a ratchet type hand tool.

The present invention may be embodied in other specific forms without departing from the spirit or potential attributes thereof, and accordingly, reference should be made to the appended claims, rather than to the foregoing specification as indicating the scope of the invention.

I claim:
1. An automatic load binder comprising in combination: a pair of axially aligned screws adapted for connection in a tension load; a sleeve receiving said screws; key means preventing relative rotation between said screws and sleeve yet allowing axial movement therebetween; a pair of telescoping tubes, each having a closed end with a respective of said screws extending in threaded engagement therethrough; radial means connecting said tubes for rotation together while allowing axial telescoping thereof, said rotation of said tubes axially moving said screws relative thereto; resilient means urging said tubes to telescope together in opposition to said load; and clutch means for helical movement along said sleeve responsive to movement caused by load variations against said resilient means, said clutch means including one-way ratchet means engaged to rotate said tubes only in a tightening direction upon said helical movement to automatically maintain said tension load at a minimum value proportional to said resilient means.

2. An automatic load binder in accordance with claim 1, wherein said screws have opposite, right hand and left hand threads, respectively, whereby said rotation of said tubes, in said tightening direction moves said screws axially together and in an opposite, loosening direction, moves said screws axially apart.

3. An automatic load binder in accordance with claim 2, wherein said key means include a longitudinal keyway within said sleeve and pins extending radially from said screws into said keyway.

4. An automatic load binder in accordance with claim 3, wherein said radial means include an axial slot in one of said tubes and a pin extending radially from the remaining of said tubes into said slot.

5. An automatic load binder in accordance with claim 4, wherein said tubes include exterior lugs for rotation thereof by a hand tool.

6. An automatic load binder in accordance with claim 5, wherein said sleeve has an exterior helical guideway, said clutch means including a follower rod in said guideway.

7. An automatic load binder in accordance with claim 6, wherein said guideway has a limited travel at one end of said sleeve.

8. An automatic load binder in accordance with claim 7, wherein said clutch means include a clutch plate and integral collar mounted for travel on said sleeve, said follower rod extending radially inward from said collar into said guideway.

9. An automatic load binder in accordance with claim 8, wherein said clutch means includes a coil spring biasing said clutch plate against the innermost of said tubes, said plate and innermost tube having engaging ratchet teeth.

10. An automatic load binder in accordance with claim 9, including a release means to separate said ratchet teeth for rotation in said loosening direction by compressing said resilient means and moving said innermost tube beyond said limited travel of said guideway for separation from said clutch plate thereat.

11. An automatic load binder in accordance with claim 10, wherein said release means include a jackscrew and jack nut between said tubes to effect said separation.

12. An automatic load binder in accordance with claim 11, wherein the release direction of said jackscrew corresponds to said loosening direction, said lugs for rotation by a hand tool extending radially outward from said jack nut.

13. An automatic load binder in accordance with claim 12, wherein said release means includes a stop means to limit axial movement by said jack nut in said tightening direction for transmittal of torque from said lugs to said tubes upon hand tightening of said load binder.

14. An automatic load binder in accordance with claim 13, wherein said jackscrew and nut have an elastic means maintaining constant engagement between mating threads thereof to prevent vibratory loosening of said load binder and to provide resistance for operation of a ratchet hand tool.

15. An automatic load binder in accordance with claim 14, wherein said matching threads have an axial groove thereacross, and said elastic means is an elongated insert member of nylon in said groove.

References Cited

UNITED STATES PATENTS

| 2,930,659 | 3/1960 | Willmore | 254—67 |
| 3,153,333 | 10/1964 | Chisholm | 267—73 |

JAMES B. MARBERT, Primary Examiner

U.S. Cl. X.R.

105—369; 230—179; 248—361; 267—1